United States Patent
Jekeswaran

(10) Patent No.: US 11,657,818 B2
(45) Date of Patent: May 23, 2023

(54) MULTI-ASSISTANT CONTROL

(71) Applicant: GM GLOBAL TECHNOLOGY OPERATIONS LLC, Detroit, MI (US)

(72) Inventor: Kumana Jekeswaran, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 227 days.

(21) Appl. No.: 17/197,257

(22) Filed: Mar. 10, 2021

(65) Prior Publication Data

US 2022/0293097 A1    Sep. 15, 2022

(51) Int. Cl.
| | |
|---|---|
| G10L 15/00 | (2013.01) |
| G10L 15/22 | (2006.01) |
| G10L 15/08 | (2006.01) |
| G10L 15/14 | (2006.01) |

(52) U.S. Cl.
CPC .............. *G10L 15/22* (2013.01); *G10L 15/08* (2013.01); *G10L 15/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,325,596 | B1* | 6/2019 | Tran | G10L 15/30 |
| 10,908,883 | B2* | 2/2021 | Webster | G06F 8/34 |
| 11,087,754 | B2* | 8/2021 | Lin | G10L 15/30 |
| 2018/0204569 | A1* | 7/2018 | Nadkar | G10L 15/22 |
| 2020/0105256 | A1* | 4/2020 | Fainberg | G10L 15/14 |
| 2020/0184963 | A1* | 6/2020 | Joseph | G06F 3/167 |

* cited by examiner

*Primary Examiner* — Vu B Hang
(74) *Attorney, Agent, or Firm* — Quinn IP Law

(57) ABSTRACT

A multi-assistant controller includes an audio recorder and a detector. The audio recorder is configured to receive a sampled audio from a microphone, store the sampled audio in a circular buffer, and transfer the sampled audio from the circular buffer to a particular voice-activated assistant. The detector is configured to store multiple wake-up phrases that are recognizable by multiple voice-activated assistants, search the sampled audio to determine multiple probabilities that the sampled audio includes the wake-up phrases, select a particular wake-up phrase that has a highest probability among the probabilities, and send a callback to the particular voice-activated assistant that the particular wake-up phrase has been detected. The sampled audio that is transferred to the particular voice-activated assistant includes the particular wake-up phrase that was detected.

20 Claims, 5 Drawing Sheets

MULTI-ASSISTANT CONTROL

INTRODUCTION

The present disclosure relates to a system and a method for multi-assistant control.

Current vehicle infotainment systems support operation of a single voice-activated assistant at a time. In designs where multiple voice-activated assistants are implemented, each voice-activated assistant is capable of listening and processing microphone inputs for wake-up-word detections. To avoid potential conflicts where two or more voice-activated assistants try to respond simultaneously, a user selects one voice-activated assistant as a default enabled assistant. The other voice-activated assistants are disabled to prevent unexpected responses.

What is desired is a technique to control multiple voice-activated assistants that are concurrently enabled.

SUMMARY

A multi-assistant controller is provided herein. The multi-assistant controller includes an audio recorder and a detector. The audio recorder is configured to receive a sampled audio from a microphone, store the sampled audio in a circular buffer, and transfer the sampled audio from the circular buffer to a particular voice-activated assistant among a plurality of voice-activated assistants. The detector is configured to store a plurality of wake-up phrases that are recognizable by the plurality of voice-activated assistants, search the sampled audio to determine a plurality of probabilities that the sampled audio includes the plurality of wake-up phrases, select a particular wake-up phrase among the plurality of wake-up phrases that has a highest probability among the plurality of probabilities, and send a callback to the particular voice-activated assistant among the plurality of voice-activated assistants that the particular wake-up phrase has been detected. The sampled audio that is transferred to the particular voice-activated assistant includes the particular wake-up phrase that was detected.

In one or more embodiments of the multi-assistant controller, the sampled audio transferred from the circular buffer to the particular voice-activated assistant includes at least one utterance that followed the particular wake-up phrase.

In one or more embodiments of the multi-assistant controller, the detector is further configured to store a plurality of assistant audio formats accepted by the plurality of voice-activated assistants, the sampled audio has an internal audio format, and the audio recorder is further configured to convert the sampled audio being transferred to the particular voice-activated assistant from the internal audio format into one of the plurality of assistant audio formats.

In one or more embodiments of the multi-assistant controller, the particular voice-activated assistant is notified in response to the highest probability exceeding a threshold.

In one or more embodiments of the multi-assistant controller, the detector is further configured to receive a notification from the particular voice-activated assistant that the particular voice-activated assistant failed to recognize the particular wake-up phrase in the sampled audio that was received from the circular buffer, and resume the search of the sampled audio for the plurality of wake-up phrases.

In one or more embodiments of the multi-assistant controller, the detector is further configured to receive a notification from the particular voice-activated assistant that the particular voice-activated assistant has finished a session with the sampled audio, command the audio recorder to clear the circular buffer, and resume the search of the sampled audio for the plurality of wake-up phrases.

In one or more embodiments of the multi-assistant controller, the detector is further configured to wait a predetermined period after the callback has been sent to the particular voice-activate assistant, and resume the search of the sampled audio for the plurality of wake-up phrases in response to a non-acknowledgement of the callback from the particular voice-activated assistant.

In one or more embodiments of the multi-assistant controller, the detector is further configured to receive an unregister signal from a given voice-activated assistant of the plurality of voice-activated assistants, and disregard the plurality of wake-up phrases that are recognized by the given voice-activated assistant during a subsequent search of the sampled audio for the plurality of wake-up phrases.

In one or more embodiments of the multi-assistant controller, the audio recorder and the detector form part of a vehicle.

A method for multi-assistant control is provided herein. The method includes storing a plurality of wake-up phrases that are recognizable by a plurality of voice-activated assistants, receiving a sampled audio from a microphone, storing the sampled audio in a circular buffer in a memory circuit, searching the sampled audio to determine a plurality of probabilities that the sampled audio includes the plurality of wake-up phrases, selecting a particular wake-up phrase among the plurality of wake-up phrases that has a highest probability among the plurality of probabilities, sending a callback to a particular voice-activated assistant among the plurality of voice-activated assistants that the particular wake-up phrase has been detected, and transferring the sampled audio from the circular buffer to the particular voice-activated assistant. The sampled audio that is transferred to the particular voice-activated assistant includes the particular wake-up phrase that was detected.

In one or more embodiments of the method, the sampled audio transferred from the circular buffer to the particular voice-activated assistant includes at least one utterance that followed the particular wake-up phrase.

In one or more embodiments, the method includes storing a plurality of assistant audio formats accepted by the plurality of voice-activated assistants, wherein the sampled audio has an internal audio format, and converting the sampled audio being transferred to the particular voice-activated assistant from the internal audio format into one of the plurality of assistant audio formats.

In one or more embodiments of the method, the particular voice-activated assistant is notified in response to the highest probability exceeding a threshold.

In one or more embodiments, the method includes receiving a notification from the particular voice-activated assistant that the particular voice-activated assistant failed to recognize the particular wake-up phrase in the sampled audio that was received from the circular buffer, and resuming the searching of the sampled audio for the plurality of wake-up phrases.

In one or more embodiments, the method include receiving a notification from the particular voice-activated assistant that the particular voice-activated assistant has finished a session with the sampled audio, clearing the circular buffer, and resuming the searching of the sampled audio for the plurality of wake-up phrases.

In one or more embodiments, the method includes waiting a predetermined period after the callback has been sent to the particular voice-activated assistant, and resuming the searching of the sampled audio for the plurality of wake-up phrases in response to a non-acknowledgement of the callback from the particular voice-activated assistant.

In one or more embodiments, the method includes receiving an unregister signal from a given voice-activated assistant of the plurality of voice-activated assistants, and disregarding the plurality of wake-up phrases that are recognized by the given voice-activated assistant during a subsequent searching of the sampled audio for the plurality of wake-up phrases.

In one or more embodiments of the method, at least one of the plurality of wake-up phrases is a single wake-up word.

A non-transitory computer-readable medium containing instructions is provided herein. The instructions when executed by a processor cause the processor to store a plurality of wake-up phrases that are recognizable by a plurality of voice-activated assistants, receive a sampled audio from a microphone, store the sampled audio in a circular buffer, search the sampled audio to determine a plurality of probabilities that the sampled audio includes the plurality of wake-up phrases, select a particular wake-up phrase among the plurality of wake-up phrases that has a highest probability among the plurality of probabilities, send a callback to a particular voice-activated assistant among the plurality of voice-activated assistants that the particular wake-up phrase has been detected, and transfer the sampled audio from the circular buffer to the particular voice-activated assistant. The sampled audio that is transferred to the particular voice-activated assistant includes the particular wake-up phrase that was detected.

In one or more embodiments of the non-transitory computer-readable medium, the instructions cause the processor to store a plurality of assistant audio formats accepted by the plurality of voice-activated assistants, wherein the sampled audio has an internal audio format, and convert the sampled audio being transferred to the particular voice-activated assistant from the internal audio format into one of the plurality of assistant audio formats.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure address supporting multiple wake-up phrases and/or wake-up words (hereafter wake-up phrases) concurrently in platforms (e.g., vehicles) with multiple voice-activated assistants. A controller includes an audio recorder (or audio module) and a centralized wake-up detector (or detection module). The audio recorder captures a sequence of sampled audio data points in a circular buffer. Sampled audio is buffered for additional validation and processing of a one-shot utterance that may follow the wake-up phrase. The detector supports multiple voice-activated assistants concurrently. The detector leverages a pre-trained multi-class classification model to generate detection probabilities for each wake-up phrase previously registered by the voice-activated assistants. In response to finding one or more probabilities that exceed a threshold, the detector sends a callback message to the voice-activated assistant that registered the highest probability wake-up phrase. The sampled audio in the circular buffer is subsequently provided to the winning voice-activated assistant. The voice-activated assistant may perform a self-verification of the wake-up phrase and the utterance that may follow the wake-up phrase. By implementing the multi-assistant controller, multiple voice-activated assistants are simultaneously available to a person in the vehicle. Furthermore, a single voice-activated assistant may respond to given voice commands thereby avoiding potentially conflicted responses.

Figure 1:
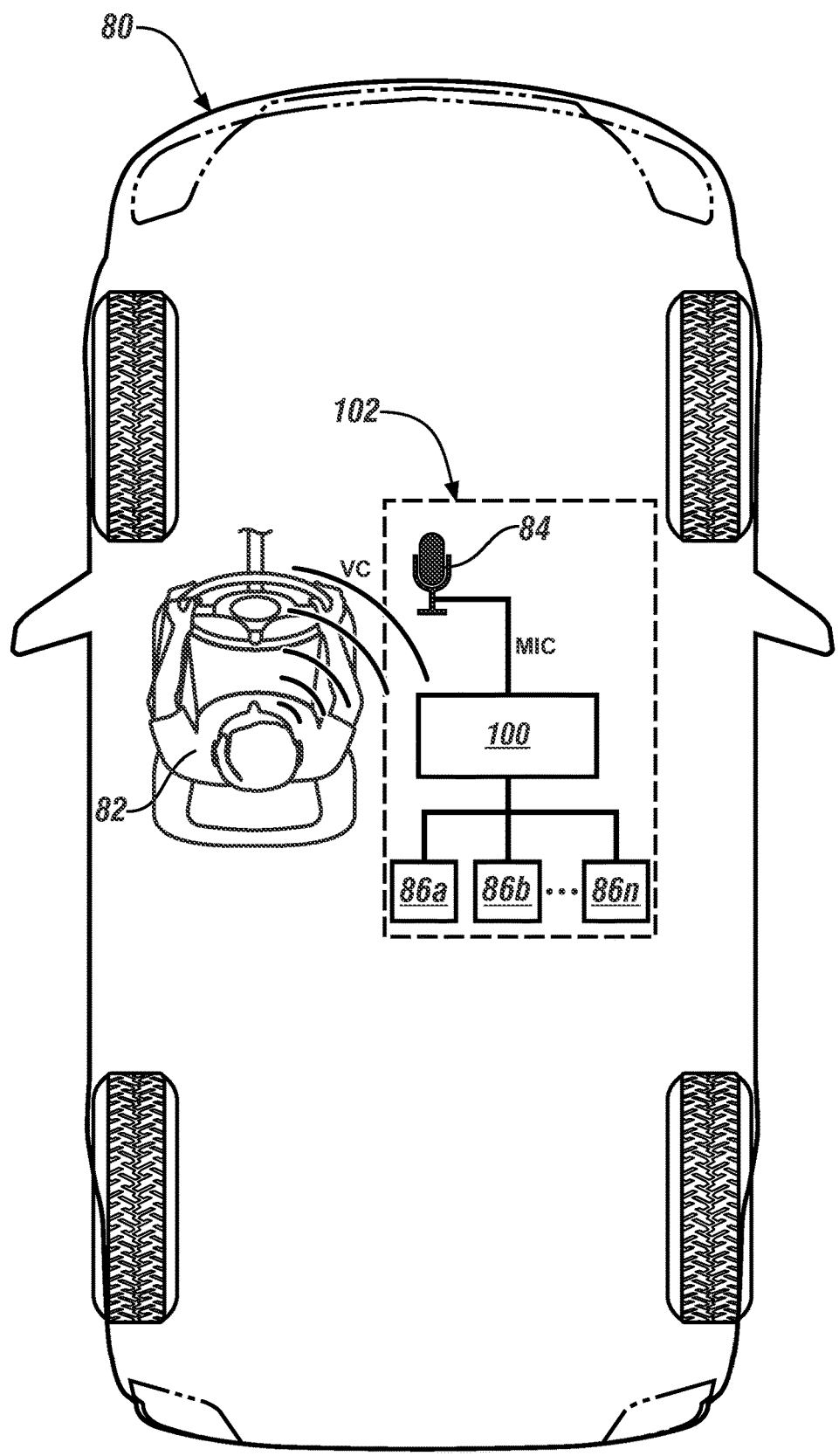
FIG. 1 is a schematic diagram illustrating a context of a vehicle in accordance with one or more exemplary embodiments.

Referring to FIG. 1, a schematic diagram illustrating a context of a vehicle 80 is shown in accordance with one or more exemplary embodiments. The vehicle 80 may be occupied by a person 82. The vehicle 80 includes one or more microphones 84 (one shown), multiple voice-activated assistants 86a-86n, and a multi-assistant controller 100. The person 82 and the microphone 84 are disposed in a cabin of the vehicle 80. The voice-activated assistants 86a-86n and the microphone 84 are in signal communication with the multi-assistant controller 100. A combination of the microphone 84, the voice-activated assistants 86a-86n and the multi-assistant controller 100 may be referred to as a system 102.

The person 82 may be a driver of the vehicle 80 or a passenger in the vehicle 80. The person 82 may speak a variety of voice commands (e.g., VC) received by the microphone 84. The voice commands may include wake-up phrases intended to invoke a response from one of the voice-activated assistants 86a-86n.

The voice command VC may be a word, a phrase and/or a sentence spoken by the person 82. The voice command is sometimes used to activate a particular voice-activated assistant 86a-86n. Sometimes, the voice command may be an answer to a question posed to the person 82 by the particular voice-activated assistant 86a-86n.

The microphone 84 implements an audio microphone. The microphone 84 is operational to convert the voice command from the person 82 into a microphone signal (e.g., MIC). The microphone signal is transferred to the multi-assistant controller 100.

The voice-activated assistants 86a-86n implement a variety of electronic assistants capable of responding to the voice commands. Each voice-activated assistant 86a-86n is associated with one or more wake-up phrases (e.g., "Hey Hal") that indicate that the person 82 wants a particular voice-activated assistant 86a-86n to perform a task. In various situations, the wake-up phase may be followed closely in time by an utterance (e.g., "Open the door"). The utterance may inform the particular voice-activated assistant 86a-86n what task is to be performed.

The multi-assistant controller 100 implements a computer and/or dedicated hardware circuitry. The multi-assistant controller 100 is operational to store multiple wake-up phrases that are recognizable by the voice-activated assistants 86a-86n, receive the sampled audio from the microphone 84, and store the sampled audio in a circular buffer in a memory circuit. The multi-assistant controller 100 is also operational to search the sampled audio to determine multiple probabilities that the sampled audio includes the multiple wake-up phrases, select a particular wake-up phrase that has a highest probability, and send a callback to a particular voice-activated assistant 86a-86n that the particular wake-up phrase has been detected. The multi-assistant controller 100 may also convert the sampled audio into a format acceptable to the particular voice-activated assistant 86a-86n and transfer the converted sampled audio to the particular voice-activated assistant 86a-86n. The converted sampled audio includes the highest probability wake-up phrase and the utterance (e.g., a word or a phrase) that may follow the wake-up phrase.

Figure 2:
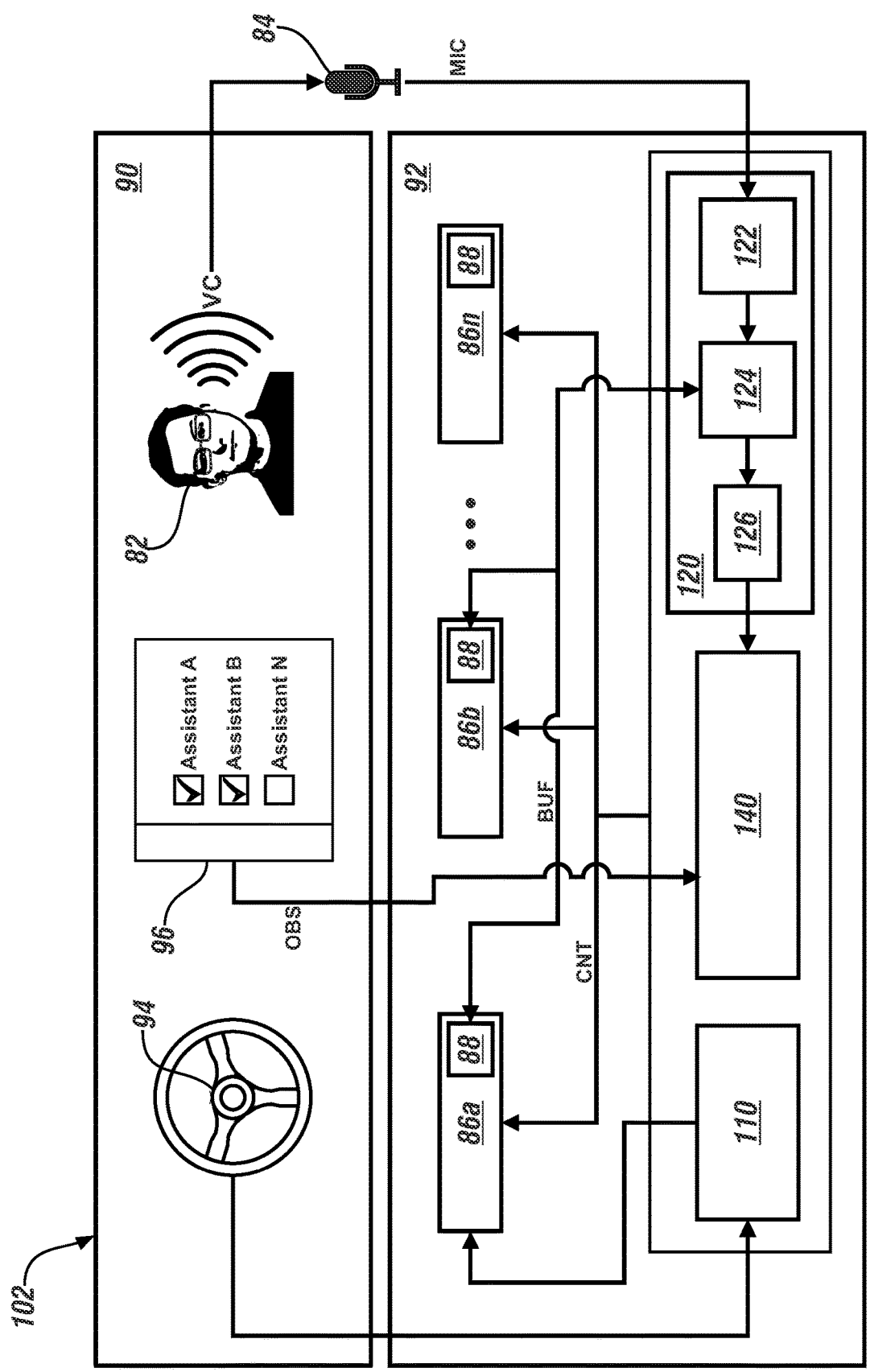
FIG. 2 is a schematic layer diagram of a system in the vehicle in accordance with one or more exemplary embodiments.

Referring to FIG. 2, a schematic layer diagram of an example implantation of the system 102 is shown in accordance with one or more exemplary embodiments. The layers generally include a human-machine-interface layer 90 and a service layer 92. The human-machine-interface layer 90 includes the microphone 84, a push-to-talk switch 94, and a display screen 96. The service layer 92 includes the voice-activated assistants 86a-86n and the multi-assistant controller 100. Each voice-activated assistant 86a-86n includes a validation module 88. The multi-assistant controller 100 includes a push-to-talk module 110, an audio recorder 120, and a detector 140. The audio recorder 120 includes an audio capture module 122, a buffer module 124, and a queue module 126.

The voice command VC is generated by the person 82 and received by the microphone 84. The microphone signal MIC is generated by the microphone 84 and transferred to the audio capture module 122. The microphone signal conveys an electrical representation of the voice command VC. A push-to-talk signal (e.g., PPT) is generated by the push-to-talk switch 94 and received by the push-to-talk module 110. The push-to-talk signal carries momentary switch press information as initiated by the person 82. An observation signal (e.g., OBS) is sent from the human-machine-interface layer 90 to the service layer 92. The service layer 92 generally has an observer/listener capability to detect changes at the display screen 96 by the person 82. Selection changes may be transferred in the observation signal and used during the next decision making. A bidirectional control signal (e.g., CNT) is exchanged between the multi-assistant controller 100 and the voice-activated assistants 86a-86n. The control signal carries callback data from the multi-assistant controller 100 to the voice activated assistants 86a-86n. The control signal also carries registration information, notifications, and deregistration information from the voice-activated assistants 86a-86n back to the multi-assistant controller 100. A buffered audio signal (e.g., BUF) may be exchanged between the activated validation modules 88 and the buffer module 124. The buffered audio signal generally conveys commands and return data. The validation modules 88 are configured to validate the wake-up phrases received via that buffered audio signal.

The push-to-talk module 110 implements a user-selectable input switch handler. A priority mapping may be established for the voice-activated assistants 86a-86n. When the push-to-talk switch 94 is pressed, the push-to-talk module 110 picks one of the registered voice-activated assistant 86a-86n with the highest priority to respond to the voice commands.

By way of example, a first voice-activated assistant 82a may have higher priority than a second voice-activated assistant 82b. Therefore, when the first voice-activated assistant 82a is connected to the multi-assistant controller 100, pressing the push-to-talk switch 94 may invoke the first voice-activated assistant 82a without speaking a voice command. When the first voice-activated assistant 82a is disconnected, pressing the push-to-talk switch 94 may now invoke the second voice-activated assistant 82b that is currently registered with the multi-assistant controller 100.

The audio recorder 120 implements an audio capture and buffer circuit (or module). The audio recorder 120 includes the audio capture module 122, the buffer module 124, and the queue module 126. The wake-up phrase map contains the wake-up phrases registered by the voice-activated assistants 86a-86n. An assistant audio format map is used to store a variety of formats suitable for the voice-activated assistants 86a-86n. The assistant audio formats may include, but is not limited to sample rates, bit depths, and a number of channels.

The audio capture module 122 is operational to receive and digitize the sampled audio from the microphone 84 and store the sampled audio in a circular buffer in the buffered audio module 124. The sampled audio is formatted to conform to an internal audio format. The internal audio format includes, but is not limited to a sample rate, a bit depth, and a number of channels.

The buffer module 124 implements a hardware memory buffer. The buffer module 124 is operational to store a few (e.g., up to ten) seconds of the sampled audio received from the audio capture module 122.

The queue module 126 is operational to pass a start index (Idx) pointer to the detector 140. The detector 140 uses the start index pointer to read audio data from the circular buffer between the start index pointer to a last written index (Written_Idx) pointer. After a particular voice-activated assistant 86a-86n has been selected by the detector 140 to process a wake-up phrase, the audio recorder 120 is configured to read the sampled audio from the circular buffer, convert the sampled audio from the internal audio format to an assistant audio format suitable for the particular voice-activated assistant 86a-86n, and transfer the converted sampled audio to the particular voice-activated assistant 86a-86n in the validation signal. The sampled audio reformatted and transferred generally includes the wake-up phrase selected by the detector 140 and additional samples that may contain an utterance that accompanied the wake-up phrase.

The detector 140 implements an audio phrase detection circuit (or module). The detector 140 is operational to store the wake-up phrases that are recognizable by the voice-activated assistants 86a-86n in a wake-up phrase map and search the sampled audio to determine the probabilities that the wake-up phrases are in the sampled audio received from the microphone 84. From the probabilities, the detector 140 may select a particular wake-up phrase among the registered wake-up phrases that has a highest probability. If the highest probability exceeds a threshold probability, a callback message is sent in the control signal to the particular voice-activated assistant 86a-86n that registered the highest probability wake-up phrase. The detector 140 identifies which particular voice-activated assistant 86a-86n will be handling the wake-up phrase to the audio recorder 120. The audio recorder 120 uses the identification to select an appropriate assistant audio format for conversion of the sampled audio.

Upon transmission of the callback message to the selected voice-activated assistant 86a-86n, the detector 140 starts a callback timer. If the selected voice-activated assistant 86a-86n cannot detect the wake-up phase in the sampled audio, selected voice-activated assistant 86a-86n sends an error notification to the detector 140 in the control signal. If the selected voice-activated assistant 86a-86n successfully detects the wake-up phase in the sampled audio, selected voice-activated assistant 86a-86n sends a success notification in the control signal. In response to the success notification, the detector 140 cancels the callback timer. If the detector 140 does not hear back from the selected voice-activated assistant 86a-86n (e.g., a non-acknowledgement) after waiting a predetermined period, the callback timer times-out and the detector 140 concludes that a failure has occurred.

Figure 3:
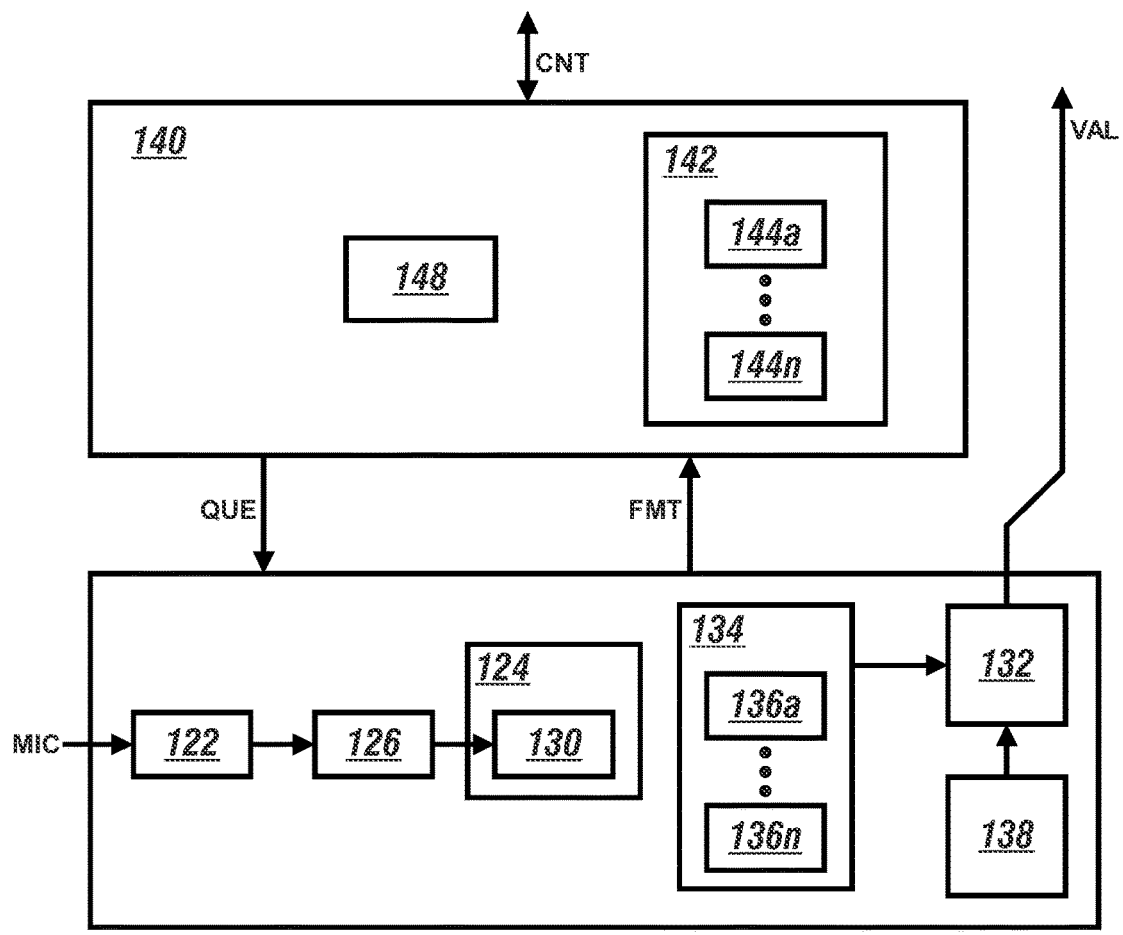
FIG. 3 is a schematic diagram of a multi-assistant controller in the system in accordance with one or more exemplary embodiments.

Referring to FIG. 3, a schematic diagram of an example implementation of the multi-assistant controller 100 is shown in accordance with one or more exemplary embodiments. The multi-assistant controller 100 includes the audio recorder 120 and the detector 140. The audio recorder 120 and/or the detector 140 may be implemented in dedicated hardware, in software executing in hardware (e.g., one or more processors), or a combination of dedicated hardware and software. The audio recorder 120 includes the audio capture module 122, the buffer module 124, the queue module 126, a circular buffer 130, an audio adapter 132, and an assistant audio format map 134. The assistant audio format map 134 is configured to store multiple assistant audio formats 136a-136n. The circular buffer 130 may be part of the buffer module 124. The detector 140 includes the wake-up phrase map 142 and a multi-class classification module 148. The wake-up phrase map 142 is configured to store multiple wake-up phrases 144a-144n. An internal audio format 138 of the sampled audio may be used by both the audio recorder 120 and the detector 140.

The microphone signal is received by the audio capture module 122. The control signal is exchanged by the detector 140 and the voice-activated assistants 86a-86n. A queued signal (e.g., QUE) is generated by the audio recorder 120 and transferred to the detector 140. The queued signal carries the start index pointer to the detector 140. The validation signal is generated by the audio adapter 132 and transferred to the voice-activated assistants 86a-86n. A format identification signal (e.g., FMT) is generated by the detector 140 and presented to the audio recorder 120. The format identification signal informs the audio recorder which particular voice-activated assistant 86a-86n has been selected to process the wake-up phrase and the utterance.

The circular buffer 130 implements a buffer in a hardware memory circuit. The circular buffer 130 is operational to hold a few seconds of the sampled audio. Once the sampled audio has reached an end of the circular buffer 130, the buffer rolls back to a beginning and overwrites old, sampled audio with new sampled audio.

The audio adapter 132 implements an audio format transcoder. The audio adapter 132 is operational to convert the sampled audio from the internal audio format 138 to one of the assistant audio formats 136a-136n, as indicated by the detector 140 in the format signal. In some situations where a particular assistant audio format 136a-136n matches the internal audio format 138, the audio adapter 132 may pass the sampled audio as-is to the particular voice-activated assistant 86a-86n without conversion.

The assistant audio format map 134 is configured to store the various assistant audio formats 136a-136n acceptable by the voice-activated assistants 86a-86n. In response to a given voice-activated assistant 86a-86n registering with the multi-assistant controller 100, the suitable assistant audio format 136a-136n of the given voice-activated assistant 86a-86n may be passed to the detector 140 in the control signal, passed to the audio recorder 120 in the format signal, and subsequently added to the assistant audio format map 134. In response to the given voice-activated assistant 86a-86n deregistering with the multi-assistant controller 100, the detector 140 may inform the audio recorder 120 via the format signal to remove the corresponding audio assistant audio format 136a-136n from the assistant audio format map 134.

The audio recorder 120 is responsible for setting up audio capture from the microphone 84. In various embodiments, the audio recorder 120 may use an application program interface (API) supported by an audio subsystem of the vehicle 80 to receive the microphone data. In setting up the audio capture, the internal audio format for the audio configurations (e.g., a sample rate, a bit depth, number of channels) may be the highest configuration to meet the supported voice-activated assistants 86a-86n to avoid data loss during a validation phase. The audio recorder 120 also leverages noise and echo cancelling methods provided by the audio system to provide lower noise sampled audio to the voice-activated assistants 86a-86n. The audio recorder 120 may also receive periodic audio callbacks based on the configured frames per callback.

The circular buffer 130 is filled during each audio capture callbacks. The circular buffer 130 is configured with a predefined size (CIRC_BUFF_SIZE). The last written index (Written_Idx) pointer tracks the last written entry into the circular buffer 130. A detected index (Detected_Idx) pointer tracks where in the circular buffer 130 that the highest probability wake-up word was detected. The circular buffer 130 may be filled (with overwrite) during a detecting stage. Once in a detected state, the circular buffer 130 may be filled until the written index pointer reaches the detected index pointer.

The audio recorder 120 is responsible for audio capturing with noise/echo cancellation. The audio recorder 120 also controls the circular buffer 130 to maintain sufficient capacity to hold samples for one or more one-shot utterances along with the wake-up phrases.

The audio recorder 120 may also support audio format conversions where a voice-activated assistant 86a-86n issues a read command for the captured buffer. The audio recorder 120 abstracts and exposes the contents of the circular buffer 130 to the voice-activated assistants 86a-86n. In embodiments implemented with software, the audio recorder 120 and the voice-activated assistants 86a-86n may be implemented in different processes.

The detector 140 is responsible for processing the audio samples received by the audio capture callback and detect the presence of the registered wake-up phrases. The detector 140 may be processing newly added buffers from the circular buffer 130. During each audio capture callback, the audio recorder 120 queues the newly added buffer index into the detector 140 to signal the arrival of the new samples. In various situations, the detector 140 may use some of the past frames along with the new frames using a sliding window approach to sequentially look for the wake-up phrases.

The detector 140 preprocess the samples queued by audio recorder 120 and feeds into the multi-class classification module 148 where the probabilities for each wake-up phrase are generated. If the highest probability is above the preconfigured threshold, the corresponding voice-activated assistant 86a-86n is triggered through a registered callback.

Once a particular voice-activated assistant 86a-86n is triggered, the particular voice-activated assistant 86a-86n may optionally perform a second-phase recognition/validation and, if available, process the utterance from the person 82. For the second-phase recognition/validation, the particular voice-activated assistant 86a-86n reads from the circular buffer 130 through the audio adapter 132, which converts the buffered data to meet a suitable audio format. The read operation may return pre-captured samples that include the wake-up-phrase and the utterance. In some situations where the entire circular buffer 130 is read, the real-time capture of a remainder of an utterance may also be returned. After the second-phase recognition is passed and the circular buffer read operation is completed, the particular voice-activated assistant 86a-86n starts a voice session and processes the utterance read from the circular buffer 130. From a perspective of the person 82, the triggered voice-activated assistant 86a-86n responds to the spoken utterance in a timely manner with the voice session.

Figure 4:
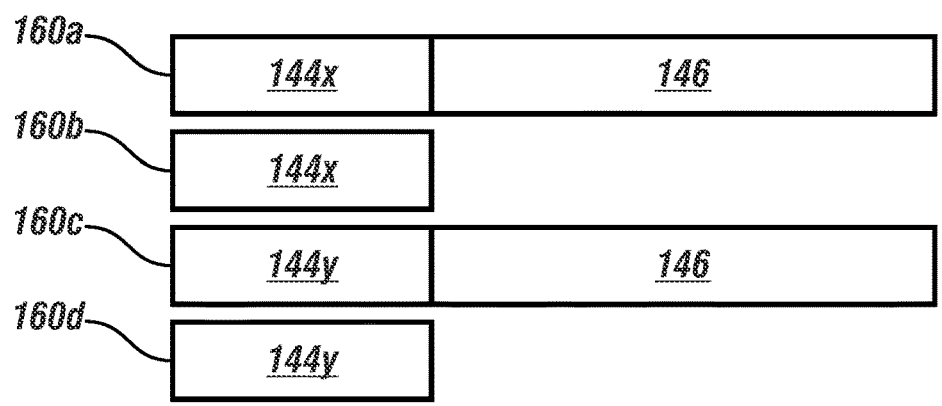
FIG. 4 is a schematic diagram of example voice commands in accordance with one or more exemplary embodiments.

Referring to FIG. 4, a schematic diagram of example voice commands is shown in accordance with one or more exemplary embodiments. In some situations, a voice command 160a may include a wake-up phrase 144x and an utterance 146. The wake-up phrase 144x may be representative of each wake-up phrase 144a-144n. For example, the wake-up phrase 144x may be "Hey Hal", "Good morning Sal" or other multi-word phrases. The utterance 146 may be as short as a single word (e.g., "temperature") or speech lasting several seconds (e.g., 10 second).

In some situations, a voice command 160b may consist of the wake-up phrase 144x alone. In such situations, the voice-activated assistant 86a-86n is responsible for determining that no utterance 146 follows the wake-up phrase 144x.

In other situations, a voice command 160c may include a single wake-up word 144y followed by the utterance 146. The wake-up word 144y may be representative of each wake-up phrase 144a-144n. Examples of the wake-up word 144y may include, but are not limited to, "Help", "Call", and "Lights".

In still other situations, a voice command 160d may consist of the wake-up word 144y alone. In such situations, the voice-activated assistant 86a-86n is responsible for determining that no utterance 146 follows the wake-up word 144y.

Figure 5:
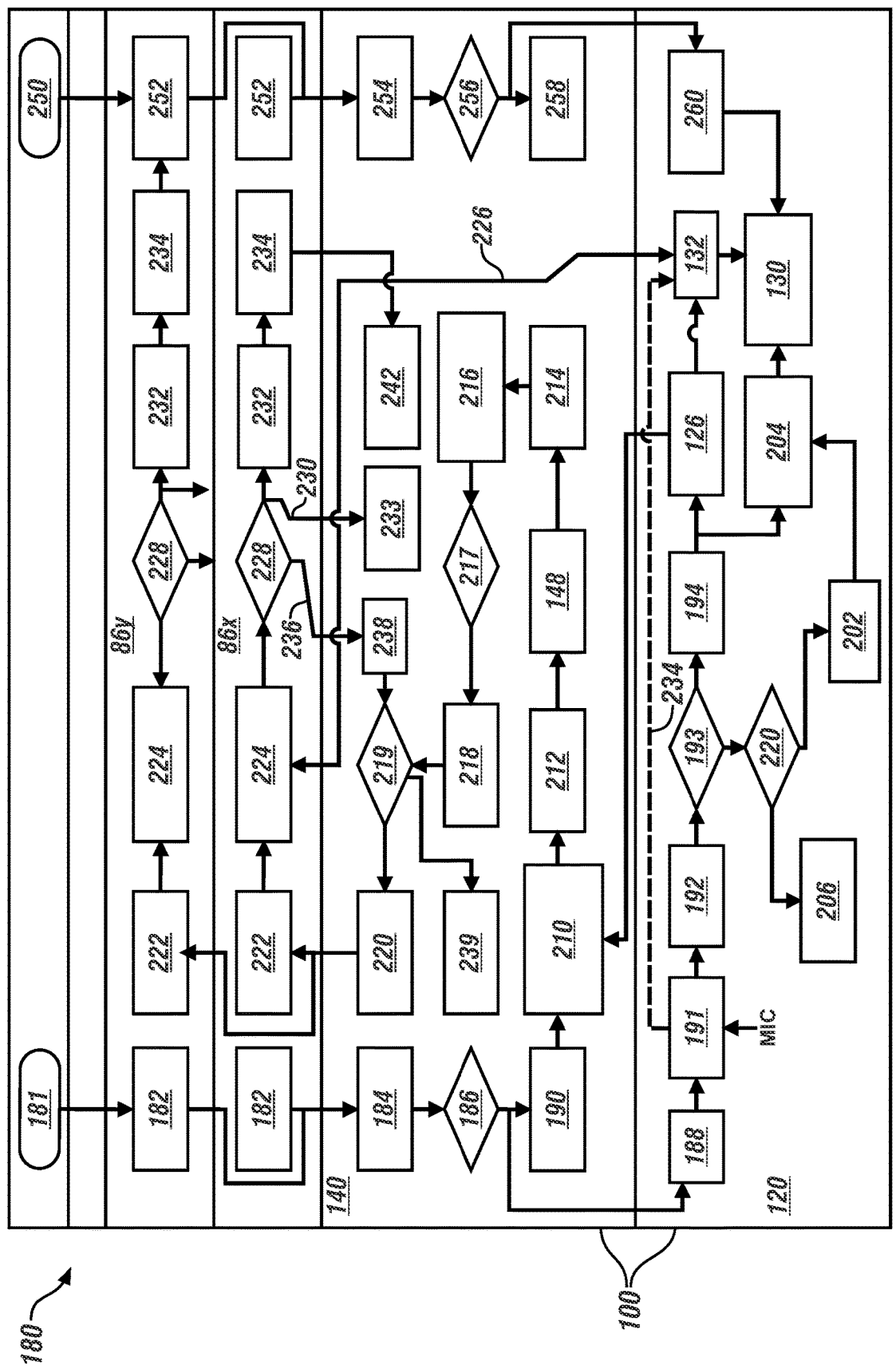
FIG. 5 is a flow diagram of a workflow in the system in accordance with one or more exemplary embodiments.

Referring to FIG. 5, a flow diagram of an example workflow 180 in the system 102 is shown in accordance with one or more exemplary embodiments. The workflow 180 is illustrated with a voice-activated assistant 86x, a voice-activated assistant 86y, and the multi-assistant controller 100. The multi-assistant controller 100 includes the audio recorder 120 and the detector 140. The voice-activated assistants 86x and 86y may be representative of each of the voice-activated assistants 86a-86n.

The multi-assistant controller 100 begins in an idle state until a first voice-activated assistant (e.g., 86x) is activated 181. The activated voice-activated assistant 86x initiates 182 a register call to the detector 140. During the register call, each voice-activated assistants 86x-86y passes one or more unique wake-up phrases, supported configurations such as an audio format, language, a detection callback, and the like. The information is added 184 to the wake-up phrase map 142 (FIG. 3) and the assistant audio format map 134 (FIG. 3). In various embodiments, the assistant audio format map 134 may be part of the wake-up phrase map 142 and so the audio format may be stored in the wake-up phrase map 142. Data in the wake-up phrase map 142 generally maps the information (including the callback, the audio format, and the language) to the unique wake-up phrases. With the multi-assistant controller 100 in the idle state per the decision block 186, the audio recorder 120 sets up 188 the audio capture, the detector 140 loads 190 a recognition model, and the multi-assistant controller 100 transitions from the idle state to a detecting state. The circular buffer 130 is initialized with the buffer size preconfigured to a size sufficient for the supported voice-activated assistants 86a-86n. The circular buffer 130 has state variables initialized to track the written index pointer and detected index pointers to pre-allocated memory locations. Subsequent register calls from other voice-activated assistants 86a-86n do not trigger the initialization as the initialization is already accomplished during the first call.

Once the audio capture is set up, the audio recorder 120 begins noise cancellation 191 of the microphone data. An audio capture callback may be received 192 for each new buffer (e.g., ΔBuffer). As the audio capture callbacks are periodically received by the audio recorder 120 (controlled by the period size during audio capture), the index position (e.g., Idx) for an initial byte of the sampled audio is calculated by incrementing the written index pointer and bringing the index pointer back to the front of the circular buffer 130 if the circular buffer size limit is reached. This is the index if the conditions are successfully met to write 204 the ΔBuffer to the circular buffer 130. If the state is detecting per the decision block 193, the ΔBuffer is set to be written into the circular buffer 130. Information (e.g., the index and ΔBuffer size) is sent to the detector 140 by the queue module 126. If the detector 140 is polling for new data periodically, the information sent to the detector 140 generally acts as a notification that new data has arrived. Where the state is not detecting per the decision step 194, if the state is detected and storage space exists between the written index and a detected index per decision step 220, the ΔBuffer is set to be added 202 into the circular buffer 130 up to a position just before the detected index, so as not to overwrite the sampled audio that contains the wake-up phrase. Depending on the space available in the circular buffer 130 between the written index and the detected index, some data in ΔBuffer may be dropped 206. If neither of the above conditions are met (e.g., the state is idle) due to some edge cases or the circular buffer 130 is full immediately following detection, the ΔBuffer is also dropped 206. The ΔBuffer is written 204 to the circular buffer 130 and the last written index pointer is updated 204 to the last written position in the circular buffer 130.

The detector 140 continuously processes 210 the newly arrived sampled audio for detection while in the detecting state. In various embodiments, the detector 140 directly polls the circular buffer 130 for new data with some periods of sleep. In some embodiments, the detector 140 may be triggered (or waken up) by the queue call from the audio recorder 120 following an audio capture callback. Once the detector 140 has sufficient sampled audio to fit a window of predetermined size, the detector 140 processes 210 the sampled audio for the presence of the wake-up phrases. The detection speed is designed to be sufficiently faster than the audio capture callback interval. The speed prevents the sampled audio in the circular buffer 130 from being overwritten before the sampled data is processed for detection. In some embodiments where the detection speed is slower, an error detection mechanism may be included to detect when the sampled audio is being overwritten before processed for detection.

The detector 140 pre-processes the buffer sampled audio to transform the data from a time domain to a frequency domain (such as Fast Fourier Transform) and extracts features that are useful (e.g., mel frequency cepstral coefficients). The pre-processing step 212 is designed to match a same step used while training the model, and is tied to a chosen machine learning approach.

The multi-class classification module 148 generates probabilities 214 for each wake-up phrase. The wake-up phrase (e.g., for the voice-activated assistant 86x) having the highest probability is selected 216 for further processing. The selected highest probability is also compared with a threshold probability that is pre-configured (usually by trial and error during tuning) to a suitable value. If the highest probability is greater than the threshold probability, the corresponding wake-up phrase is in the wake-up phrase map (e.g., the winning voice-activated assistant 86x has already registered the detected wake-up phrase), and the selected voice-activated assistant 86x is enabled in the settings per the step 217, the multi-assistant controller 100 transitions 218 to the detected state and the detection index is set to the starting index of the detected frame. If a detected wake-up phrase is available per the decision block 219, the selected voice-activated assistant 86x is notified through the detection callback, the audio adapter 132 is notified of the appropriate assistant audio format, and the callback timer is started per the step 220.

Once the notification is received 222, the selected voice-activated assistant 86x may validate 224 the detection using an internal acoustic model against the pre-captured buffer data. The sampled audio criteria for wake-up phrase detection may be different from the sampled audio stored in the circular buffer 130. Therefore, in various embodiments the selected voice-activated assistant 86x may pass the assistant audio format, such as sample rate, bit depth, and number of channels in an inter-process communication (IPC) read call 226 to the audio adapter 132. The inter-process communication generally refers to a mechanism by which an operating system allows multiple executing processes to manage shared data. If appropriate, the audio adapter 132 performs the audio format conversion (e.g., resampling) on the data received from the circular buffer 130 and returns the reformatted data to the voice-activated assistant 86x. In some embodiments, the detection callback passes information (e.g., a shared memory name, path, or key) on where to pull the buffered data from which selected voice-activated assistant 86x may use, and the audio adapter 132 is signaled to do the resampling as soon as detected. The audio adapter 132 determines the assistant audio format for the selected voice-activated assistant 86x by pulling from wake-up phrase map 142 or the assistant audio format map 134, as appropriate.

After the selected voice-activated assistant 86x performs the validation 224 and confirms the wake-up word presence, in the decision step 228, the selected voice-activated assistant 86x generates 230 a success call to signal to the multi-assistant controller 100 that the selected voice-activated assistant 86x is starting a voice session. Thereafter, the selected voice-activated assistant 86x initiates 232 the voice session, the detector 140 cancels 233 the callback timer, and the detector 140 also remains in the detected state. During the voice session, the selected voice-activated assistant 86x may continue to process an utterance following the wake up phrase. For this purpose, the selected voice-activated assistant 86x uses the remaining contents in the circular buffer 130 that follows the wake-up phrase. In cases where the selected voice-activated assistant 86x relies on additional voice data beyond what is captured in the circular buffer 130, an additional audio capture may be established in parallel while processing the circular buffer 130. As such, the audio adapter 132 may continue to stream the unbuffered sampled audio captured after the contents in the circular buffer 130 is transferred to the selected voice-activated assistant 86x. In such a case, instead of dropping the ΔBuffer once in the detected state, the unbuffered sampled audio is redirected to audio adapter 132. In other cases, a buffered audio capture is abstracted as another audio capture (e.g., similar to an AudioRecord—a subclass BufferedAudioCapture that takes some identification indicating the circular buffer 130 in the multi-assistant controller 100.) Thereafter, the selected voice-activated assistant 86x (client) opens a BufferAudioCapture that first returns the buffered circular buffer audio, and follow with the real time audio capture.

If the validation performed by the selected voice-activated assistant 86x fails per the step 228, an error call 236 signals the multi-assistant controller 100 to cancel 238 the callback timer. A check is performed to see if a next highest probability wake-up phrase is available. If the next highest probability wake-up phrase is available per the decision step 219, the detector 140 notifies decision step 220 the corresponding voice-activated assistant 86a-86n. If not, the multi-assistant controller 100 transitions 239 back to the detecting state, clears the circular buffer 130, and performs an error handing.

Once the voice session ends 234, the selected voice-activated assistant 86x calls a session end to signal the multi-assistant controller 100 to transition 242 back to the detecting state. During the session end call, the multi-assistant controller 100 also clears the circular buffer 130 to avoid stale data in the buffer.

In response to being deactivated 250 (e.g., during certain events such as sleep or a user selection), the deactivated voice-activated assistant 86x or 86y notifies 252 the detector 140 of a deregistration by sending an unregister signal. The detector 140 responds by removing 254 the voice-activated assistant 86x or 86y from the wake-up phrase map and the assistant audio format map. When each voice-activated assistants 86a-86n has been deregistered per the decision step 256, the multi-assistant controller 100 unloads 258 the recognition model, tears down the audio capture, clears the circular buffer 130 and resets to the idle state in the step 260.

Figure 6:
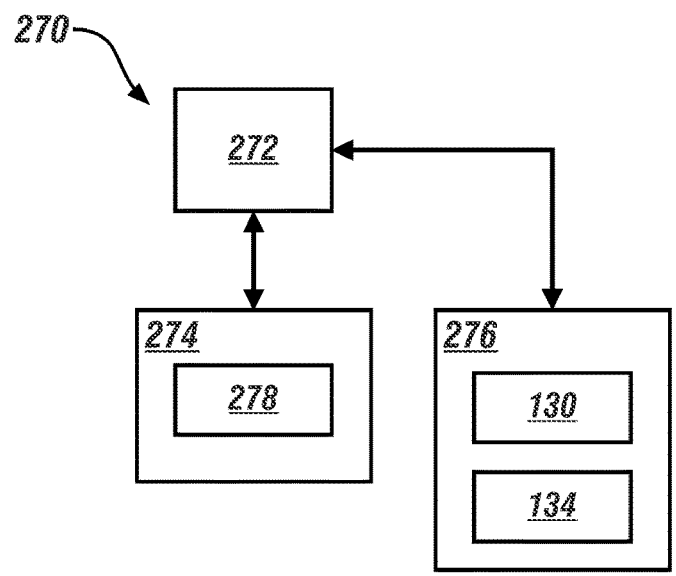
FIG. 6 is a schematic diagram of a computer-based system in accordance with one or more exemplary embodiments.

Referring to FIG. 6, a schematic diagram of an example implementation of a computer 270 is shown in accordance with one or more exemplary embodiments. The computer 270 may implement the multi-assistant controller 100 and the voice-activated assistants 86a-86n.

The computer 270 includes one or more processors 272 (one shown), a non-transitory computer-readable medium 274, and a computer-readable medium 276. The non-transitory computer-readable medium 274 may contain instructions (or software program or code) 278. The instructions 278 may be read and executed by the processor 272. The instructions implement the process of controlling the multiple voice-activated assistants 86a-86n. The instructions also implement the functionality of the individual voice-activated assistants 86a-86n. The computer-readable medium 276 may implement a volatile and/or a nonvolatile memory circuit. The computer-readable medium 276 is configured to store the circular buffer 130 and the assistant audio format map 134. In various embodiments, the instructions 278, circular buffer 130 and/or the assistant audio format map 134 may reside in the same storage medium.

Figure 7:
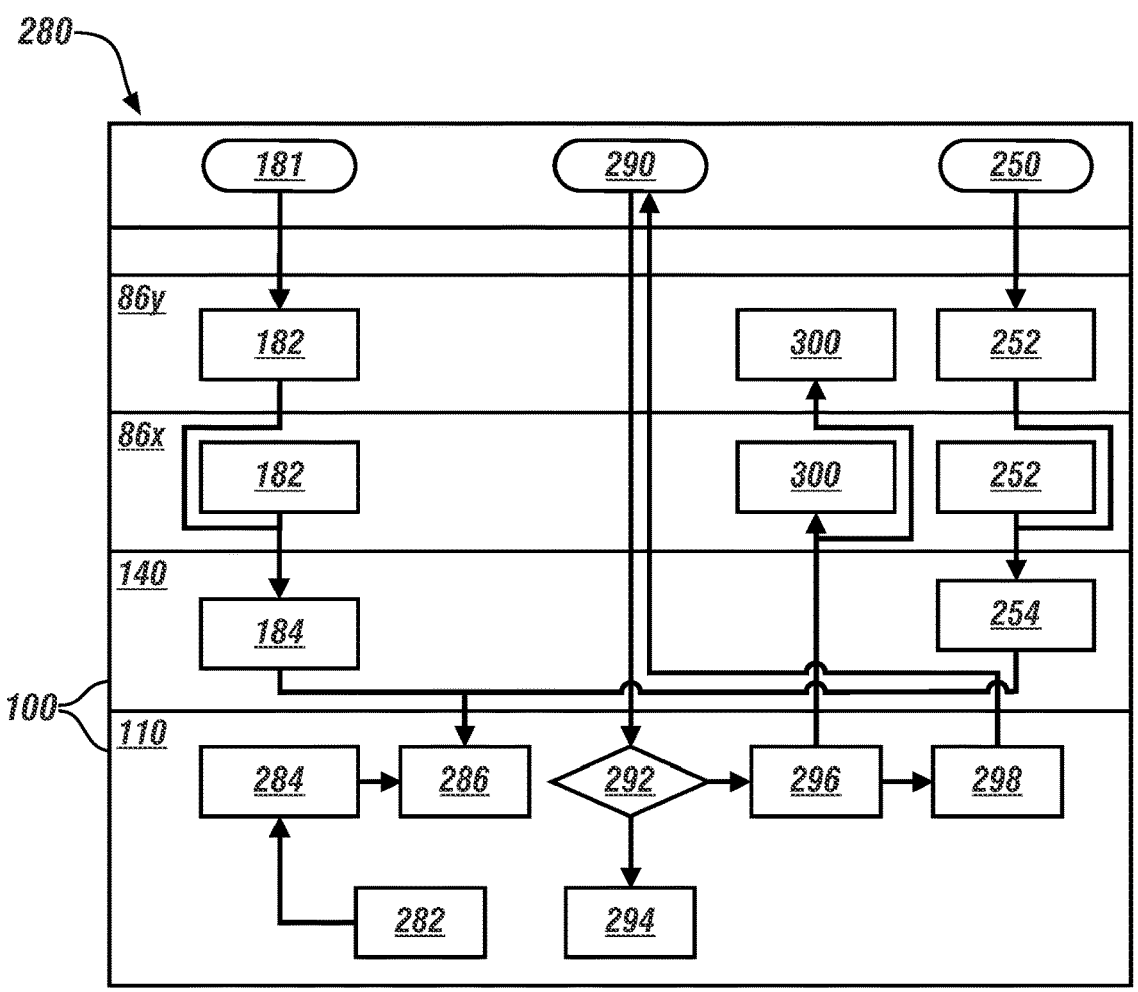
FIG. 7 is a flow diagram of a workflow for push-to-talk operations in accordance with one or more exemplary embodiments.

Referring to FIG. 7, a flow diagram of an example workflow 280 for push-to-talk operations is shown in accordance with one or more exemplary embodiments. The workflow 280 is illustrated with the voice-activated assistant 86x, the voice-activated assistant 86y, and the multi-assistant controller 100. The multi-assistant controller 100 includes the push-to-talk module 110 and the detector 140.

The multi-assistant controller 100 begins in the idle state until a first voice-activated assistant (e.g., 86x) is activated 181. The activated voice-activated assistant 86x initiates 182 a register call to the detector 140. During the register call, each voice-activated assistants 86x-86y passes one or more unique wake-up phrases, supported configurations (language etc.), and a detection callback. The information is added 184 to the wake-up phrase map. A push-to-talk configuration database 282 generally stores a priority mapping among the voice-activated assistants 86a-86n. The push-to-talk configuration data may be read 284 into an assistant priority map. A push-to-talk receiver may be updated 286 to the registered (active) voice-activated assistant 86x-86y with the highest priority.

The person 82 may press 290 the push-to-talk switch 94. In response to the press, the push-to-talk module 110 performs a check 292 for a non-null push-to-talk receiver. If the push-to-talk receiver is null, an error handling routine 294 may be implemented and an mHandler may be set to false. If the push-to-talk receiver is not null, the push-to-talk module 110 notifies 296 the voice-activated assistant 86x or 86y pointed to by the push-to-talk receiver, and the mHandler may be set to true. The push-to-talk module 110 returns 298 the mHandler no matter if the event is successfully handled or not. The voice-activated assistants 86x or 86y may generate a push-to-talk callback 300 in response to being notified. In various embodiments, the push-to-talk configuration data for the push-to-talk controls may be pulled from another screen through an observer thereby allowing user customization of the system 102.

In response to being deactivated 250, the deactivated voice-activated assistant 86x or 86y notifies 252 the detector 140 of a deregistration. The detector 140 responds by removing 254 the voice-activated assistant 86x or 86y from the wake-up phrase map 142 and the assistant audio format map 134, where implemented separate from the wake-up phrase map 142. When the active voice-activated assistants (e.g., 86x) is deregistered, the push-to-talk receiver is updated to point to the active voice-activated assistant (e.g., 86y) with the next highest priority.

Embodiments of the present disclosure provide a user-configurable centralized wake-up phrase detection module using a multi-class classification module 148 to detect and trigger voice-activated assistants 86a-86n. Buffered audio capture in the centralized module allows the voice-activated assistants 86a-86n to perform additional validation and one-shot utterance processing. The centralized approach eliminates a criteria for each voice-activated assistant 86a-86n to monitor and process microphone data individually for the wake-up phrases. By leveraging the pre-trained multi-class classification module 148, the person 82 may configure the multiple voice-activated assistants 86a-86n to be triggered through the associated wake up phrases. Upon detection, a selected voice-activated assistant 86a-86n may also use the buffered sampled to perform another validation and/or process utterances from person 82.

While the best modes for carrying out the disclosure have been described in detail, those familiar with the art to which this disclosure relates will recognize various alternative designs and embodiments for practicing the disclosure within the scope of the appended claims.

What is claimed is:

1. A multi-assistant controller comprising:
an audio recorder configured to:
receive a sampled audio from a microphone,
store the sampled audio in a circular buffer, and
transfer the sampled audio from the circular buffer to a particular voice-activated assistant among a plurality of voice-activated assistants; and
a detector configured to:
store a plurality of wake-up phrases that are recognizable by the plurality of voice-activated assistants,
search the sampled audio to determine a plurality of probabilities that the sampled audio includes the plurality of wake-up phrases,
select a particular wake-up phrase among the plurality of wake-up phrases that has a highest probability among the plurality of probabilities,
send a callback to the particular voice-activated assistant among the plurality of voice-activated assistants that the particular wake-up phrase has been detected, wherein the sampled audio transferred to the particular voice-activated assistant includes the particular wake-up phrase that was detected,
receive an unregister signal from a given voice-activated assistant of the plurality of voice-activated assistants, and
disregard the plurality of wake-up phrases that are recognized by the given voice-activated assistant during a subsequent search of the sampled audio for the plurality of wake-up phrases.

2. The multi-assistant controller according to claim 1, wherein the sampled audio transferred from the circular buffer to the particular voice-activated assistant includes at least one utterance that followed the particular wake-up phrase.

3. The multi-assistant controller according to claim 1, wherein the detector is further configured to store a plurality of assistant audio formats accepted by the plurality of voice-activated assistants, the sampled audio has an internal audio format, and the audio recorder is further configured to convert the sampled audio being transferred to the particular voice-activated assistant from the internal audio format into one of the plurality of assistant audio formats.

4. The multi-assistant controller according to claim 1, wherein the particular voice-activated assistant is notified in response to the highest probability exceeding a threshold.

5. The multi-assistant controller according to claim 1, wherein the detector is further configured to:
receive a notification from the particular voice-activated assistant that the particular voice-activated assistant failed to recognize the particular wake-up phrase in the sampled audio that was received from the circular buffer; and
resume the search of the sampled audio for the plurality of wake-up phrases.

6. The multi-assistant controller according to claim 1, wherein the detector is further configured to:
receive a notification from the particular voice-activated assistant that the particular voice-activated assistant has finished a session with the sampled audio;
command the audio recorder to clear the circular buffer; and
resume the search of the sampled audio for the plurality of wake-up phrases.

7. The multi-assistant controller according to claim 1, wherein the detector is further configured to:
wait a predetermined period after the callback has been sent to the particular voice-activate assistant; and
resume the search of the sampled audio for the plurality of wake-up phrases in response to a non-acknowledgement of the callback from the particular voice-activated assistant.

8. The multi-assistant controller according to claim 1, wherein the audio recorder and the detector form part of a vehicle.

9. A method for multi-assistant control comprising:
storing a plurality of wake-up phrases that are recognizable by a plurality of voice-activated assistants;
receiving a sampled audio from a microphone;
storing the sampled audio in a circular buffer in a memory circuit;
searching the sampled audio to determine a plurality of probabilities that the sampled audio includes the plurality of wake-up phrases;
selecting a particular wake-up phrase among the plurality of wake-up phrases that has a highest probability among the plurality of probabilities;
sending a callback to a particular voice-activated assistant among the plurality of voice-activated assistants that the particular wake-up phrase has been detected;
transferring the sampled audio from the circular buffer to the particular voice-activated assistant, wherein the sampled audio transferred to the particular voice-activated assistant includes the particular wake-up phrase that was detected;
receiving an unregister signal from a given voice-activated assistant of the plurality of voice-activated assistants; and
disregarding the plurality of wake-up phrases that are recognized by the given voice-activated assistant during a subsequent searching of the sampled audio for the plurality of wake-up phrases.

10. The method according to claim 9, wherein the sampled audio transferred from the circular buffer to the particular voice-activated assistant includes at least one utterance that followed the particular wake-up phrase.

11. The method according to claim 9, further comprising:
storing a plurality of assistant audio formats accepted by the plurality of voice-activated assistants, wherein the sampled audio has an internal audio format; and
converting the sampled audio being transferred to the particular voice-activated assistant from the internal audio format into one of the plurality of assistant audio formats.

12. The method according to claim 9, wherein the particular voice-activated assistant is notified in response to the highest probability exceeding a threshold.

13. The method according to claim 9, further comprising:
receiving a notification from the particular voice-activated assistant that the particular voice-activated assistant failed to recognize the particular wake-up phrase in the sampled audio that was received from the circular buffer; and
resuming the searching of the sampled audio for the plurality of wake-up phrases.

14. The method according to claim 9, further comprising:
receiving a notification from the particular voice-activated assistant that the particular voice-activated assistant has finished a session with the sampled audio;
clearing the circular buffer; and
resuming the searching of the sampled audio for the plurality of wake-up phrases.

15. The method according to claim 9, further comprising:
waiting a predetermined period after the callback has been sent to the particular voice-activate assistant; and
resuming the searching of the sampled audio for the plurality of wake-up phrases in response to a non-acknowledgement of the callback from the particular voice-activated assistant.

16. The method according to claim 9, wherein at least one of the plurality of wake-up phrases is a single wake-up word.

17. A non-transitory computer-readable medium containing instructions that when executed by a processor cause the processor to:
store a plurality of wake-up phrases that are recognizable by a plurality of voice-activated assistants;
receive a sampled audio from a microphone;
store the sampled audio in a circular buffer;
search the sampled audio to determine a plurality of probabilities that the sampled audio includes the plurality of wake-up phrases;
select a particular wake-up phrase among the plurality of wake-up phrases that has a highest probability among the plurality of probabilities;
send a callback to a particular voice-activated assistant among the plurality of voice-activated assistants that the particular wake-up phrase has been detected; and
transfer the sampled audio from the circular buffer to the particular voice-activated assistant, wherein the sampled audio transferred to the particular voice-activated assistant includes the particular wake-up phrase that was detected;
receive an unregister signal from a given voice-activated assistant of the plurality of voice-activated assistants; and
disregard the plurality of wake-up phrases that are recognized by the given voice-activated assistant during a subsequent searching of the sampled audio for the plurality of wake-up phrases.

18. The non-transitory computer-readable medium according to claim 17, wherein the instructions when executed further cause the processor to:
store a plurality of assistant audio formats accepted by the plurality of voice-activated assistants, wherein the sampled audio has an internal audio format; and
convert the sampled audio being transferred to the particular voice-activated assistant from the internal audio format into one of the plurality of assistant audio formats.

19. The non-transitory computer-readable medium according to claim 17, wherein the instructions when executed further cause the processor to:
receive a notification from the particular voice-activated assistant that the particular voice-activated assistant failed to recognize the particular wake-up phrase in the sampled audio that was received from the circular buffer; and
resume the searching of the sampled audio for the plurality of wake-up phrases.

20. The non-transitory computer-readable medium according to claim 17, wherein the instructions when executed further cause the processor to:
receive a notification from the particular voice-activated assistant that the particular voice-activated assistant has finished a session with the sampled audio;
clear the circular buffer; and
resume the searching of the sampled audio for the plurality of wake-up phrases.

* * * * *